(12) United States Patent
Stickelmaier et al.

(10) Patent No.: US 10,829,247 B2
(45) Date of Patent: Nov. 10, 2020

(54) THRUST APPARATUSES, SYSTEMS, AND METHODS

(71) Applicant: The Boeing Company, Chicago, IL (US)

(72) Inventors: John F. Stickelmaier, Manhattan Beach, CA (US); Julie M. Perkins, Hawthorne, CA (US); Kurt B. Kreiner, Rancho Palos Verdes, CA (US); Philip D. Nguyen, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 239 days.

(21) Appl. No.: 15/803,417

(22) Filed: Nov. 3, 2017

(65) Prior Publication Data

US 2018/0057189 A1    Mar. 1, 2018

Related U.S. Application Data

(62) Division of application No. 14/533,934, filed on Nov. 5, 2014, now Pat. No. 9,834,324.

(51) Int. Cl.
    *B64G 1/00*    (2006.01)
    *B64G 1/40*    (2006.01)
    *B64G 1/42*    (2006.01)
    *F03H 1/00*    (2006.01)

(52) U.S. Cl.
    CPC .............. *B64G 1/007* (2013.01); *B64G 1/405* (2013.01); *B64G 1/428* (2013.01); *F03H 1/0018* (2013.01)

(58) Field of Classification Search
    CPC ........ B64G 1/007; B64G 1/405; B64G 1/428; B64G 1/42; F03H 1/0018
    See application file for complete search history.

(56) References Cited

U.S. PATENT DOCUMENTS

| 2,520,709 A | 8/1950 | Bitler |
| 5,874,786 A | 2/1999 | McVey et al. |
| 6,031,334 A | 2/2000 | Meyer |
| 6,154,383 A | 11/2000 | Cardwell, Jr. |
| 9,086,060 B1 | 7/2015 | Stickelmaier et al. |

(Continued)

FOREIGN PATENT DOCUMENTS

| CN | 101932469 | 12/2010 |
| CN | 103687787 | 3/2014 |

(Continued)

OTHER PUBLICATIONS

Canadian Office Action concerning Canadian Patent Application No. 2,905,685 dated Sep. 25, 2018.

(Continued)

*Primary Examiner* — Valentina Xavier
(74) *Attorney, Agent, or Firm* — Kunzler Bean & Adamson

(57) ABSTRACT

Described herein is a thrust system for a vehicle that includes at least three electrical power controllers, at least four electrical switches each configured to receive electrical power from at least one of the at least three electrical power controllers, and at least three thrusters each configured to receive electrical power from at least one of the at least three electrical switches. The at least four electrical switches are operable to switch a supply of electrical power from any of the at least three electrical power controllers to any one of the at least three thrusters.

20 Claims, 8 Drawing Sheets

(56) References Cited

U.S. PATENT DOCUMENTS

| | | |
|---|---|---|
| 9,469,420 B2 | 10/2016 | Stickelmaier et al. |
| 2006/0072265 A1 | 4/2006 | Bucella et al. |
| 2014/0032002 A1 | 1/2014 | Iwashima et al. |
| 2014/0137537 A1 | 5/2014 | Stickelmaier et al. |

FOREIGN PATENT DOCUMENTS

| | | | |
|---|---|---|---|
| CN | 103917779 | 7/2014 | |
| EP | 2735736 | 5/2014 | |
| WO | 2013034825 | 3/2012 | |
| WO | 20130343825 | 3/2013 | |
| WO | WO-2013034825 A1 * | 3/2013 | ........... F03H 1/0012 |

OTHER PUBLICATIONS

Krauthamer, et al., Power Processing Units for High Powered Solar Electric Propulsion Using MPD Thrusters, pp. 1,285-1,290, Jet Propulsion Laboratory, California Institute of Technology, Pasadena CA.

Brophy, The Dawn Ion Propulsion System, Space Science Reviews, Nov. 16, 2011, pp. 251-261, Jet Propulsion Laboratory, Pasadena, CA.

Chinese Office Action concerning Chinese Patent Application No. 201510717265.8 dated Jul. 16, 2019.

Brazilian Office Action concerning Brazilian Patent Application No. BR102015027740 dated Apr. 20, 2020.

\* cited by examiner

THRUST APPARATUSES, SYSTEMS, AND METHODS

CROSS-REFERENCE TO RELATED APPLICATION

This application is a divisional application of U.S. patent application Ser. No. 14/533,934, filed Nov. 5, 2014, which is incorporated herein by reference.

FIELD

This disclosure relates generally to propulsion systems for vehicles, and more particularly to electrically-powered thrust systems for vehicles.

BACKGROUND

Some propulsion systems for vehicles include electrically-powered thrusters. Power for the thrusters is supplied from one or two electrical power controllers. For space-based vehicles, the electrical power controllers may supply power to the thrusters for station keeping and transfer of orbit operations.

SUMMARY

The subject matter of the present application has been developed in response to the present state of the art. Additionally, the subject matter has been developed in response to the increased interest in electrically-powered thrust systems for electric satellites, which are solely dependent on electric propulsion. For satellites with a single propulsion system, enhanced redundancy schemes are desirable. Accordingly, the subject matter of the present application has been developed to provide propulsion apparatuses, systems, and methods that improve upon prior art techniques. For example, the subject matter of the present application, in some implementations, provides a propulsion system and method that increases redundancy compared to prior electrically-powered thrust systems. More particularly, in some embodiments, described herein is a thrust system that improves reliability by increasing redundancy, and improves the performance of transfer of orbit operations.

According to one embodiment, a thrust system for a vehicle includes at least three electrical power controllers, at least four electrical switches each configured to receive electrical power from at least one of the at least three electrical power controllers, and at least three thrusters each configured to receive electrical power from at least one of the at least three electrical switches. The at least four electrical switches are operable to switch a supply of electrical power from any of the at least three electrical power controllers to any one of the at least three thrusters.

In some implementations of the thrust system, the switches are operable to allow electrical power from the at least three electrical power controllers to be concurrently supplied to the at least three thrusters. Each electrical power controller supplies power to a respective one of the at least three thrusters.

According to some implementations of the thrust system, one of the at least three electrical power controllers is a redundant power controller. In a first mode of operation of the thrust system, a first of the at least three electrical power controllers supplies electrical power to a first of the at least three thrusters, a second of the at least three electrical power controllers supplies electrical power to a second of the at least three thrusters, and the redundant power controller supplies no electrical power to the first and second thrusters. In a second mode of operation of the thrust system, one of the first and second electrical power controllers supplies no electrical power to the first and second thrusters, respectively, and the redundant power control supplies electrical power to the one of the first and second electrical power controllers.

In certain implementations of the thrust system, each electrical power controller includes a first power output and a second power output. Each electrical switch includes a first power input, a second power input, and at least one of a first power output and a second power output. The first power output of a first of the electrical power controllers is electrically coupled to the first power input of a first of the electrical switches, and the second power output of the first of the electrical power controllers is electrically coupled to the first power input of a second of the electrical switches. The first power output of a second of the electrical power controllers is electrically coupled to the first power input of a third of the electrical switches, and the second power output of the second of the electrical power controllers is electrically coupled to the second power input of a fourth of the electrical switches. The first power output of a third of the electrical power controllers is electrically coupled to the second power input of the third of the electrical switches, and the second power output of the third of the electrical power controllers is electrically coupled to the second power input of the second of the electrical switches.

According to one implementation of the thrust system, the first power output of the second of the electrical switches is electrically coupled to the first power input of the fourth of the electrical switches. Also, the first power output of the third of the electrical switches is electrically coupled to the second power input of the first of the electrical switches. Additionally, the first power output of the first of the electrical switches is electrically coupled to a first of the thrusters, and the second power output of the first of the electrical switches is electrically coupled to a second of the thrusters. Further, the first power output of the fourth of the electrical switches is electrically coupled to a third of the thrusters, and the second power output of the fourth of the electrical switches is electrically coupled to a fourth of the thrusters.

In an implementation of the thrust system, the first of the electrical switches is actuatable to either (i) route electrical power from the first power input of the first of the electrical switches to the first power output of the first of the electrical switches and route electrical power from the second power input of the first of the electrical switches to the second power output of the first of the electrical switches, or (ii) route electrical power from the first power input of the first of the electrical switches to the second power output of the first of the electrical switches and route electrical power from the second power input of the first of the electrical switches to the first power output of the first of the electrical switches. Additionally, the second of the electrical switches is actuatable to either (i) route electrical power from the first power input of the second of the electrical switches to the first power output of the second of the electrical switches, or (ii) route electrical power from the second power input of the second of the electrical switches to the first power output of the second of the electrical switches. Also, the third of the electrical switches is actuatable to either (i) route electrical power from the first power input of the third of the electrical switches to the first power output of the third of the electrical switches, or (ii) route electrical power from the second power input of the third of the electrical switches to the first power output of the third of the electrical switches. Further, the fourth of the electrical switches is actuatable to either (i) route electrical power from the first power input of the fourth of the electrical switches to the first power output of the fourth of the electrical switches and route electrical power from the second power input of the fourth of the electrical switches to the second power output of the fourth of the electrical switches, or (ii) route electrical power from the first power input of the fourth of the electrical switches to the second power output of the fourth of the electrical switches and route electrical power from the second power input of the fourth of the electrical switches to the first power output of the fourth of the electrical switches.

In yet one implementation of the thrust system, the switches are configured such that the first power outputs of the first, second, and third electrical power controllers supply power only to the first and second thrusters, and the second power outputs of the first, second, and third electrical power controllers supply power only to the third and fourth thrusters.

According to some implementations, the thrust system includes four electrical power controllers and four thrusters. The at least four electrical switches can be operable to switch a supply of electrical power from any of the four electrical power controllers to any one of the four thrusters. The switches can be operable to allow electrical power from the four electrical power controllers to be concurrently supplied to the four thrusters, with each electrical power controller supplying power to a respective one of the four thrusters. In an implementation, each electrical power controller includes a first power output, each electrical switch includes a first power input, a second power input, a first power output, and a second power output, the first power output of a first of the electrical power controllers is electrically coupled to the first power input of a first of the electrical switches, the first power output of a second of the electrical power controllers is electrically coupled to the second power input of the first of the electrical switches, the first power output of a third of the electrical power controllers is electrically coupled to the first power input of a second of the electrical switches, and the first power output of a fourth of the electrical power controllers is electrically coupled to the second power input of the second of the electrical switches.

In one implementation of the thrust system, the first power output of the first of the electrical switches is electrically coupled to the first power input of a third of the electrical switches, the second power output of the first of the electrical switches is electrically coupled to the first power input of a fourth of the electrical switches, the first power output of the second of the electrical switches is electrically coupled to the second power input of the third of the electrical switches, the second power output of the second of the electrical switches is electrically coupled to the second power input of the fourth of the electrical switches, the first power output of the third of the electrical switches is electrically coupled to a first of the thrusters, and the second power output of the third of the electrical switches is electrically coupled to a second of the thrusters, and the first power output of the fourth of the electrical switches is electrically coupled to a third of the thrusters, and the second power output of the fourth of the electrical switches is electrically coupled to a fourth of the thrusters.

According to an implementation of the thrust system, the first of the electrical switches is actuatable to either (i) route electrical power from the first power input of the first of the electrical switches to the first power output of the first of the electrical switches and route electrical power from the second power input of the first of the electrical switches to the second power output of the first of the electrical switches, or (ii) route electrical power from the first power input of the first of the electrical switches to the second power output of the first of the electrical switches and route electrical power from the second power input of the first of the electrical switches to the first power output of the first of the electrical switches. Further, the second of the electrical switches is actuatable to either (i) route electrical power from the first power input of the second of the electrical switches to the first power output of the second of the electrical switches and route electrical power from the second power input of the second of the electrical switches to the second power output of the second of the electrical switches, or (ii) route electrical power from the first power input of the second of the electrical switches to the second power output of the second of the electrical switches and route electrical power from the second power input of the second of the electrical switches to the first power output of the second of the electrical switches. Also, the third of the electrical switches is actuatable to either (i) route electrical power from the first power input of the third of the electrical switches to the first power output of the third of the electrical switches and route electrical power from the second power input of the third of the electrical switches to the second power output of the third of the electrical switches, or (ii) route electrical power from the first power input of the third of the electrical switches to the second power output of the third of the electrical switches and route electrical power from the second power input of the third of the electrical switches to the first power output of the third of the electrical switches. Additionally, the fourth of the electrical switches is actuatable to either (i) route electrical power from the first power input of the fourth of the electrical switches to the first power output of the fourth of the electrical switches and route electrical power from the second power input of the fourth of the electrical switches to the second power output of the fourth of the electrical switches, or (ii) route electrical power from the first power input of the fourth of the electrical switches to the second power output of the fourth of the electrical switches and route electrical power from the second power input of the fourth of the electrical switches to the first power output of the fourth of the electrical switches.

In some implementations of the thrust system, each of the three thrusters is an ion propulsion thruster. Each of the three thrusters can be enabled for maximum thrust output. The at least four electrical switches can be configured such that each of the at least three electrical power controllers supplies electrical power to only one of the at least three thrusters at a time.

According to another embodiment, a thrust system for a vehicle includes at least three electrical power controllers, at least four electrical switches in power receiving communication with at least one of the electrical power controllers, and at least four thrusters each in power receiving communication with one of the electrical switches. The thrust system also includes a system controller that is operably coupled to the electrical switches and thrusters to control electrical power supply from the electrical power controllers to the thrusters, wherein in a first mode the system controller operates the electrical switches and thrusters to nonconcurrently supply power to each of the four thrusters from less than three electrical power controllers, and in a second mode the system controller operates the electrical switches and thrusters to concurrently supply power to each of three of the four thrusters from a respective one of the three electrical power controllers. As defined herein, supplying power to the thrusters from controllers in this embodiment, and relative implementations, means the thrusters are consuming electrical power received from the controllers to generate thrust.

According to some implementations of the thrust system, in a third mode the system controller operates the electrical switches and thrusters to nonconcurrently supply power to each of the four thrusters from less than three electrical power controllers, wherein one of the electrical power controllers supplying power to the thrusters in the third mode does not supply power to the thrusters in the first mode.

In one implementation of the thrust system, the vehicle includes a satellite, and the system further includes the satellite.

According to yet another embodiment, a thrust system for a vehicle includes at least four electrical power controllers, at least four electrical switches in power receiving communication with at least one of the electrical power controllers, and at least four thrusters each in power receiving communication with one of the electrical switches. The thrust system also includes a system controller operably coupled to the electrical switches and thrusters to control electrical power supply from the electrical power controllers to the thrusters, wherein in a first mode the system controller operates the electrical switches and thrusters to nonconcurrently supply power to each of the four thrusters from less than four electrical power controllers, and in a second mode the system controller operates the electrical switches and thrusters to concurrently supply power to each of the four thrusters from a respective one of the four electrical power controllers.

According to one implementation of the thrust system, in a third mode the system controller operates the electrical switches and thrusters to nonconcurrently supply power to each of the four thrusters from a dedicated one of each of the four electrical power controllers.

In yet another embodiment, a method for providing thrust for a vehicle includes supplying electrical power from at least a first of at least three electrical power controllers, and routing electrical power from the at least first of the at least three electrical power controllers to any of at least four thrusters via at least three electrical switches.

In some implementations of the method, at least a second of the three electrical power controllers does not supply electrical power, and the method further includes stopping the supply of electrical power from the at least first of the three electrical power controllers, supplying electrical power from the at least second of the at least three electrical power controllers, and routing electrical power from the at least second of the at least three electrical power controllers to any of the at least four thrusters via at least three electrical switches.

According to certain implementations, the method further includes supplying electrical power from each of the at least three electrical power controllers, and concurrently routing electrical power from the at least three electrical power controllers to a respective one of each of three of the at least four thrusters. The vehicle can be a satellite. Electrical power from each of the at least three electrical power controllers can be supplied and electrical power from the at least three electrical power controllers can be concurrently routed to a respective one of each of three of the at least four thrusters to concurrently generate thrust during a transfer orbit operation of the satellite. As defined in this embodiment, routing electrical power to the thrusters means consuming electrical power by the thrusters to generate thrust.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
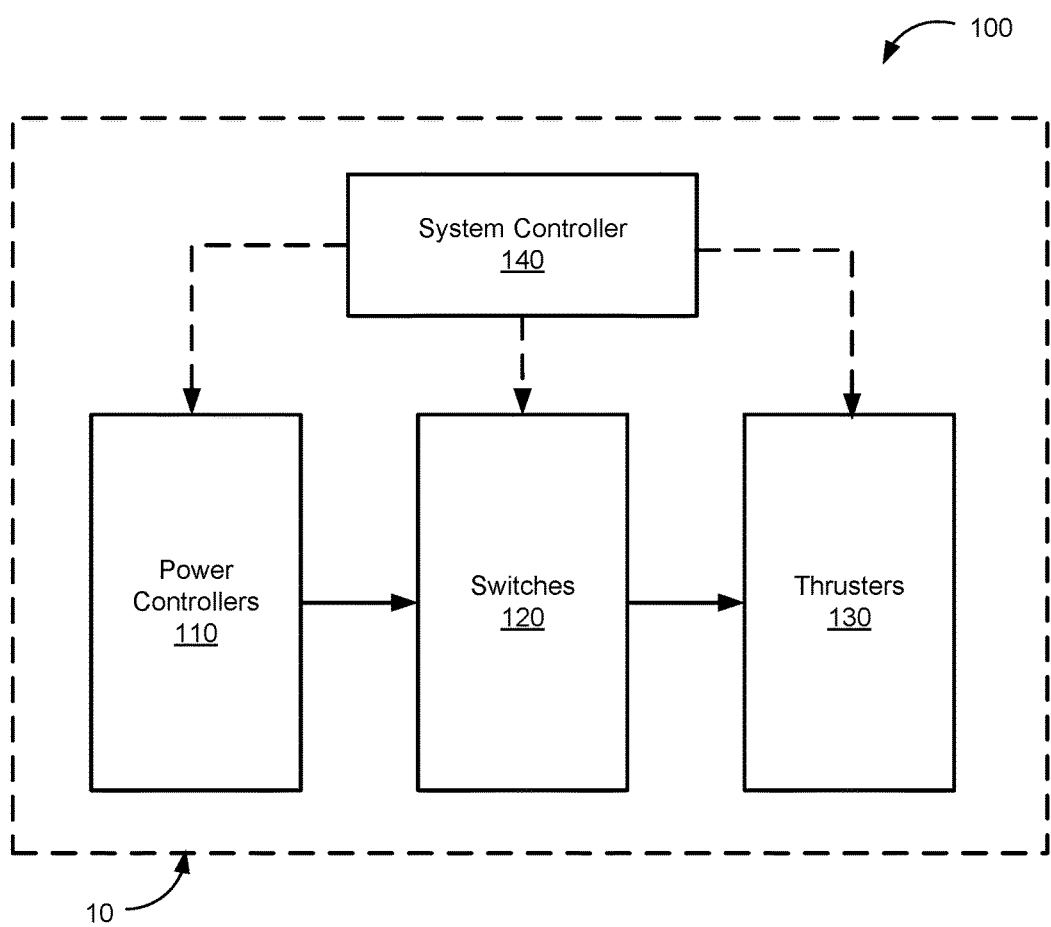
FIG. 1 is a schematic block diagram of a vehicle with a thrust system according to one embodiment.

Referring to FIG. 1, one embodiment of a vehicle 10 includes a thrust system 100. The vehicle 10 can be any of various vehicles propelled by thrust, such as an aircraft, spacecraft, automobile, watercraft, and the like. In one embodiment, the vehicle 10 is a satellite propelled through space by the thrust system 100. The thrust system 100 includes power controllers 110, switches 120, and thrusters 130. Operation of the power controllers 110 and switches 120 is controlled by a system controller 140. Generally, the system controller 140 commands the power controllers 110 to supply electrical power to the switches 120, commands the switches to route the received electrical power from the power controllers to the thrusters 130, and commands the thrusters 130 to switch on to consume the electrical power and provide thrust. The system controller 140 may control the power controllers 110, switches 120, and thrusters 130 according to one or more modes as will be described in more detail below.

Figure 2:
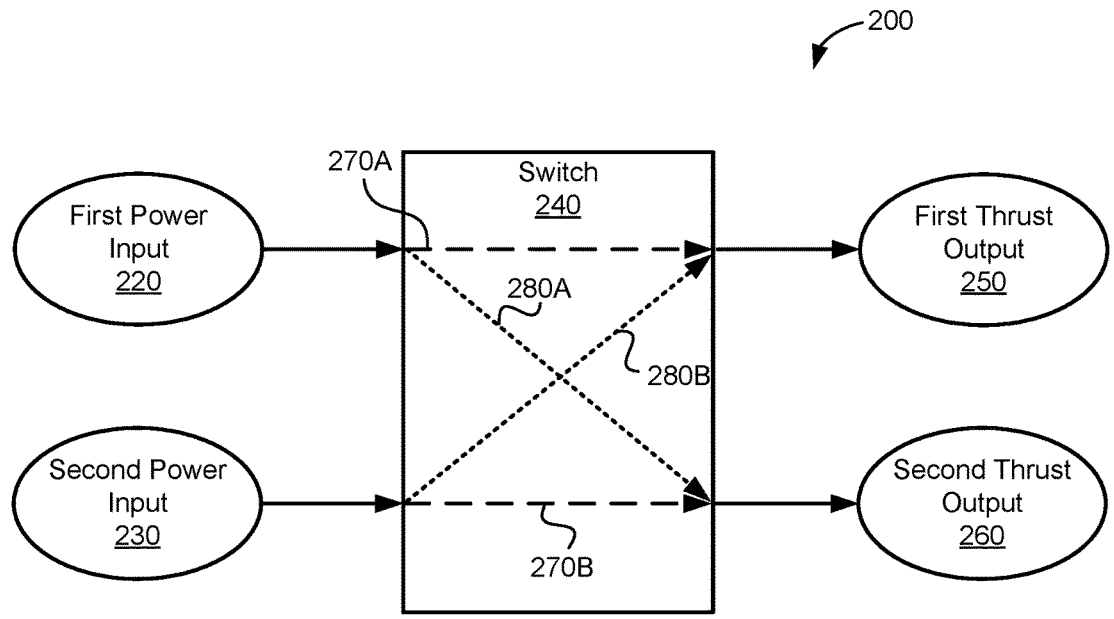
FIG. 2 is a schematic block diagram of a thrust system with a first type of switch according to one embodiment.

As shown in FIG. 2, one embodiment of a thrust system 200 includes first and second power inputs 220, 230, respectively, a switch 240, and first and second thrust outputs 250, 260, respectively. Generally, the thrust system 200 is configured to selectively supply electrical power from one or more electrical power controllers to one or more thrusters, or other switches, via the switch 240. The first power input 220 represents electrical power supplied by a first electrical power controller, and the second power input 230 represents electrical power supplied by a second electrical power controller. Similarly, the first thrust output 250 represents electrical power transmitted to a first thruster, and the second thrust output 260 represents electrical power transmitted to a second thruster.

The operation of the switch 240 is shown generally. In one embodiment, the switch 240 is selectively operable, and switchable between, two modes of operation. In a first, or normal, mode of operation, the switch 240 outputs the first power input 220 as the first thrust output 250 via a first electrical circuit 270A defined by the switch, and separately outputs the second power input 230 as the second thrust output 260 via a separate second electrical circuit 270B defined by the switch. In contrast, in the second, or cross-strapped, mode of operation, the switch 240 outputs the first power input 220 as the second thrust output 260 via a third electrical circuit 280A defined by the switch, and separately outputs the second power input 230 as the first thrust output 250 via a separate fourth electrical circuit 280B defined by the switch.

Figure 3:
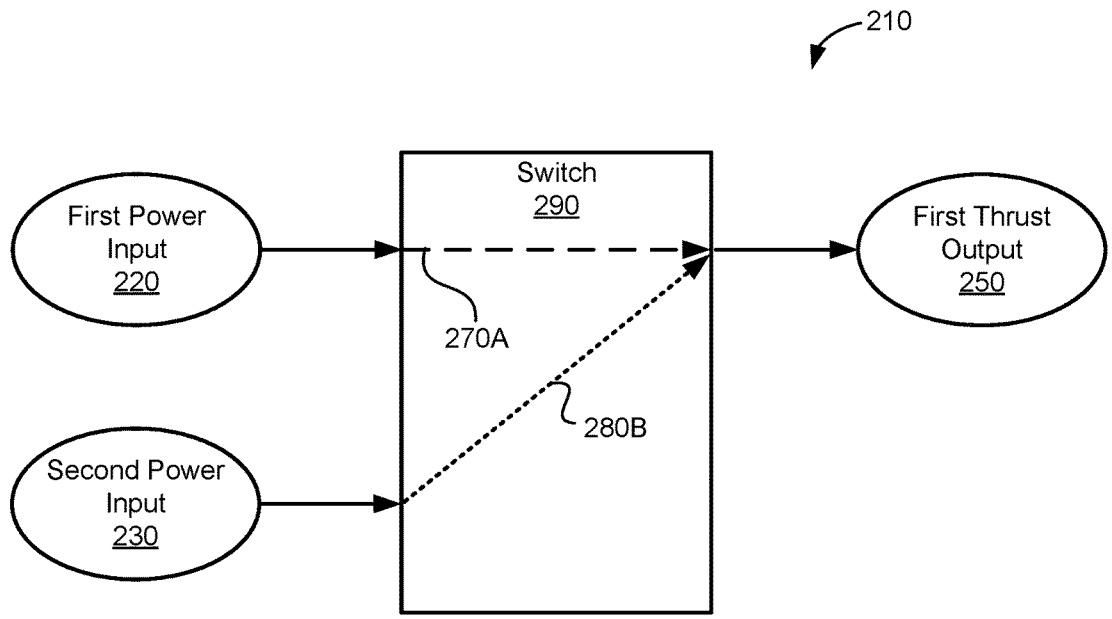
FIG. 3 is a schematic block diagram of a thrust system with a second type of switch according to one embodiment.

Referring to FIG. 3, according to another embodiment, a thrust system 210 includes a switch 290. Like the thrust system 200 of FIG. 2, the thrust system 210 of FIG. 3 includes first and second power inputs 220, 230, respectively. However, the thrust system 210 includes only a first thrust output 250, and does not include a second thrust output 260. Generally, the thrust system 210 is configured to selectively supply electrical power from one or more electrical power controllers to one thruster, or one other switch, via the switch 290. In other words, the switch 290 includes two power inputs and one power output. In one implementation, the switch 290 includes a second power output port that is capped to prevent the port from transmitting power.

The operation of the switch 290 is shown generally. In one embodiment, the switch 290 is selectively operable, and switchable between, two modes of operation. In a first, or normal, mode of operation, the switch 290 outputs the first power input 220 as the first thrust output 250 via the first electrical circuit 270A defined by the switch. In contrast, in the second, or cross-strapped, mode of operation, the switch 290 outputs the second power input 230 as the first thrust output 250 via the fourth electrical circuit 280B defined by the switch.

According to some implementations, the switches 240, 290 may be selectively switched between the first and second modes based on the inoperability of one or more of the first and second power controllers and/or inoperability of one or more of the first and second thrusters. For example, should one thruster become disabled, and power is desirably supplied from the first power controller for any of various reasons, the switches 240, 290 can be switched from the first mode to the second mode. Similarly, in another example, should operation of the first thruster be desired, and the first power controller become disabled, the switches 240, 290 can be switched from the first mode to the second mode.

The switches 240, 290 can be any of various physical switches for routing electrical power between electrical power connectors and thrusters. As will be described in more detail below, the voltage and current of the electrical power routed by the switches 240, 290 are high and sufficient to power an electrically-powered thruster for a vehicle. Accordingly, the voltage and current of the electrical power routed by the switch 240, 290 are significantly higher than the voltages and currents of electrical communications routed through computer hardware switches. For example, in one implementation, the current of the electrical power routed by the switches 240, 290 is on the order of tens and hundreds of amps (e.g., about 30 amps), while the current of electrical communications in computer environments is on the order of tenths and hundredths of amps. Similarly, according to some implementations, the voltage of electrical power routed by the switches 240, 290 can be up to 1,000 volts, and even higher is some cases. Therefore, the switches 240, 290 are not the same as a computer switch for routing electrical communication signals within a computing environment.

According to some embodiments, the switches 240, 290 are rotary switches, such as described in U.S. patent application Ser. No. 13/683,688, filed Nov. 21, 2012, and Ser. No. 14/258,954, filed Apr. 22, 2014, which are incorporated herein by reference. Generally, a rotary switch includes a shaft assembly that is rotatable to switch between the first and second modes of operation.

Figure 4:
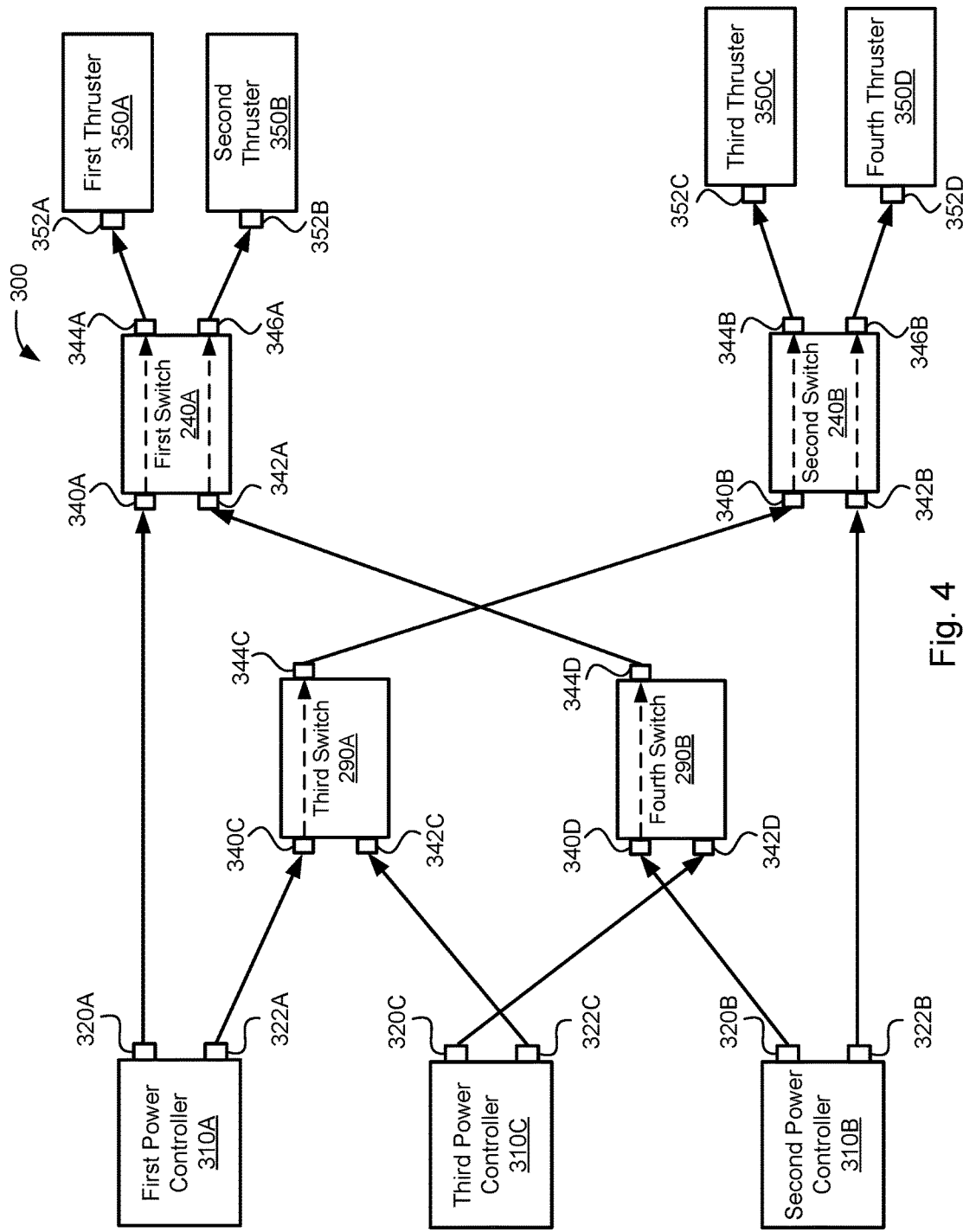
FIG. 4 is a schematic block diagram of a thrust system in a first configuration according to one embodiment.

Referring now to FIG. 4, according to one embodiment, a thrust system 300 includes first, second, and third power controllers 310A-C, first and second switches 240A-B, third and fourth switches 290A-B, and first, second, third, and fourth thrusters 350A-D, respectively. The first, second, and third power controllers 310A-C are respectively electrically connected to the first and second switches 240A-B, and third and fourth switches 290A-B, by electrical lines as indicated by solid directional lines extending between these components in FIG. 4. Similarly, the first and second switches 240A-B, and third and fourth switches 290A-B, are respectively electrically connected to the first, second, third, and fourth thrusters 350A-D by electrical lines as indicated by solid directional lines extending between these components in FIG. 4.

As used in all FIGS. 4-8, the solid directional lines extending between components represent electrical lines and the direction of transmission of electrical power through the electrical lines. The electrical lines can be a single or multiple electrical conduits/circuits in some implementations. According to one implementation, each electrical line between components includes multiple circuits (e.g., 9 circuits) that are switches simultaneously to transmit power through the electrical line. Generally, the electrical lines between the components transmit electrical power between the components.

The electrical lines are electrically coupled to each component via one or more input and/or output terminals. The terminals facilitate the electrical connection between the components and an electrical line, and the transmission of electrical power between the components. For example, the first power controller 310A includes a first output terminal 320A and a second output terminal 322A, the second power controller 310B includes a first output terminal 320B and a second output terminal 322B, and the third power controller 310C includes a first output terminal 320C and a second output terminal 322C. Also as an example, the first switch 240A includes first input terminal 340A, second input terminal 342A, first output terminal 344A, and second output terminal 346A, the second switch 240B includes first input terminal 340B, second input terminal 342B, first output terminal 344B, and second output terminal 346B, the third switch 290A includes first input terminal 340C, second input terminal 342C, and first output terminal 344C, and the fourth switch 290B includes first input terminal 340D, second input terminal 342D, and first output terminal 344D. Also, the first thruster 350A includes a first input terminal 352A, the second thruster 350B includes a first input terminal 352B, the third thruster 350C includes a first input terminal 352C, and the fourth thruster 350D includes a first input terminal 352D.

Regarding the interconnection between the power controllers and the switches, although other configurations are possible in view of the present disclosure, in the illustrated configuration of the thrust system 300, the first output terminal 320A of the first power controller 310A is electrically connected directly to the first input terminal 340A of the first switch 240A, and the second output terminal 322A of the first power controller is electrically connected directly to the first input terminal 340C of the third switch 290A. Additionally, the first output terminal 320B of the second power controller 310B is electrically connected directly to the first input terminal 340D of the fourth switch 290B, and the second output terminal 322B of the second power controller is electrically connected directly to the second input terminal 342B of the second switch 240B. Furthermore, the first output terminal 320C of the third power controller 310C is electrically connected directly to the second input terminal 342D of the fourth switch 290B, and the second output terminal 322C of the third power controller is electrically connected directly to the second input terminal 342C of the third switch 290A.

Regarding the interconnection between the switches and the thrusters, although other configurations are possible in view of the present disclosure, in the illustrated configuration of the thrust system 300, the first output terminal 344A of the first switch 240A is electrically connected directly to the input terminal 352A of the first thruster 350A, and the second output terminal 346A of the first switch is electrically connected directly to the input terminal 352B of the second thruster 350B. Also, the first output terminal 344B of the second switch 240B is electrically connected directly to the input terminal 352C of the third thruster 350C, and the second output terminal 346B of the second switch is electrically connected directly to the input terminal 352D of the fourth thruster 350D. Furthermore, the first output terminal 344C of the third switch 290A is electrically connected directly to the first input terminal 340B of the second switch 240B, and the first output terminal 344D of the fourth switch 290B is electrically connected directly to the second input terminal 342A of the first switch 240A.

In some implementations, each first, second, and third power controller 310A-C is coupled to or includes a power source, such as a battery (e.g., a solar-powered battery). Each power controller 310A-C controls the supply of power from a power source to the output terminals of the respective controller. Further, when powered on or "hot," each power controller 310A-C is configured to supply electrical power to its output terminals concurrently. In other words, when on, each power controller 310A-C supplies electrical power to its output terminals at the same time, such that both output terminals of a single power controller are considered hot at the same time. However, a single thruster consumes electrical power from only one of the output terminals of a power controller at a time depending on the selective operation of the thruster. In some implementations, a system controller controls the operation of the switches and thrusters to determine which thrusters receive power from which output terminals of which power controller. The first, second, and third power controllers 310A-C can be operated and activated independently of each other via a system controller so that each power controller can be considered redundant relative to the other power controllers.

The first and second switches 240A, 240B of the thrust system 300 are configured similarly to switch 240 of FIG. 2. The third and fourth switches 290A, 290B of the thrust system 300 are configured similarly to switch 290 of FIG. 3.

Each first, second, third, and fourth thruster 350A-D can be any of various thrusters known in the art. For example, according to one implementation, each thruster 350A-D includes an ion propulsion system known in the art, such as ion propulsion systems that use gridded thrusters, ion propulsion systems that use Hall effect thrusters, and the like. For example, according to some implementations, each of the thrusters 350A-D can be a xenon (or other ionizable gas) ion propulsion system for providing thrust for station keeping and transfer of orbit of satellites. Generally, the first, second, third, and fourth thrusters 350A-D utilize electrical power from one or all of the first, second, and third power controllers 310A-C to generate propulsion by heating and accelerating charged ions from the gas. In some implementations, the thrusters 350A-D each includes an ion extraction assembly, a housing which forms an ionization chamber, a discharge electron source and an electrode system which are positioned within the chamber, a magnetic field generator, which is also positioned within the chamber, and a neutralizer positioned adjacent the ion extraction assembly.

In a basic operation of an ion propulsion system, the ionizable gas is supplied to the chamber via a valve and primary electrons are injected into the gas from the electron source. A discharge voltage applied to the electrode system accelerates these electrons into collisions with gas atoms to generate a plasma. The magnetic field generator typically includes annular permanent magnets and is configured to develop magnetic flux lines proximate to the housing. The magnetic flux lines direct electrons along extended paths, and thus enhance the generation of the plasma. The ion extraction assembly has a screen grid, an accelerator grid, and a decelerator grid. Electrical power from one or more of the power controllers 320A-C is applied to the grids to cause the ion extraction assembly to extract an ion beam from the plasma and accelerate it away from the thruster. The ion beam generates a force upon the ion thruster and spacecraft to which it is attached. Finally, the neutralizer injects an electron stream into the proximity of the ion beam to offset potential charge-depleting effects of the ion beam. The first, second, third, and fourth thrusters 350A-D can be operated independently of each other so that each thruster can be considered redundant relative to the other thrusters.

Although the thrusters 350A-D of the illustrated embodiment are described as ion propulsion systems, in other embodiments, other types of electrical propulsion systems, or even chemical propulsion systems can be used. Similarly, although in the illustrated embodiments, the electrical devices receiving electrical power from the power controllers are thrusters, in other embodiments, the electrical devices can be any of various other electrical devices. Moreover, although the system of the illustrated embodiment includes three power controllers, four switches, and four thrusters, in other embodiments, the system can include more than three power controllers, more than four switches, and/or more than four thrusters.

The thrust system 300, as shown in FIG. 4, is configured in a first operational mode. In the first operational mode, each of the first and second switches 240A-B and third and fourth switches 290A-B are configured in a normal mode of operation. In the normal mode of operation, as indicated by dashed directional lines, the first input terminals 340A-D of the first, second, third, and fourth switches are electrically connected to the first output terminals 344A-D of the first, second, third, and fourth switches 240A, 240B, 290A, 290B, respectively, and the second input terminals 342A-B of the first and second switches are electrically connected to the second output terminals 346A-B of the first and second switches, respectively.

With the thrust system 300 configured in the first operational mode, as shown using directional lines, electrical power from the first output terminal 320A of the first power controller 310A is routed to the first thruster 350A to power the first thruster 350A, electrical power from the first output terminal 320B of the second power controller 310B is routed to the second thruster 350B, electrical power from the second output terminal 322A of the first power controller is routed to the third thruster 350C, and electrical power from the second output terminal 322B of the second power controller is routed to the fourth thruster 350D. Furthermore, in the first operational mode, the first and second output terminals 320C, 322C of the third power controller 310C are electrically isolated from the thrusters. In this manner, the third power controller 310C can be considered an inactive, or redundant, controller because the third power controller is not used to supply power to any of the thrusters.

Figure 5:
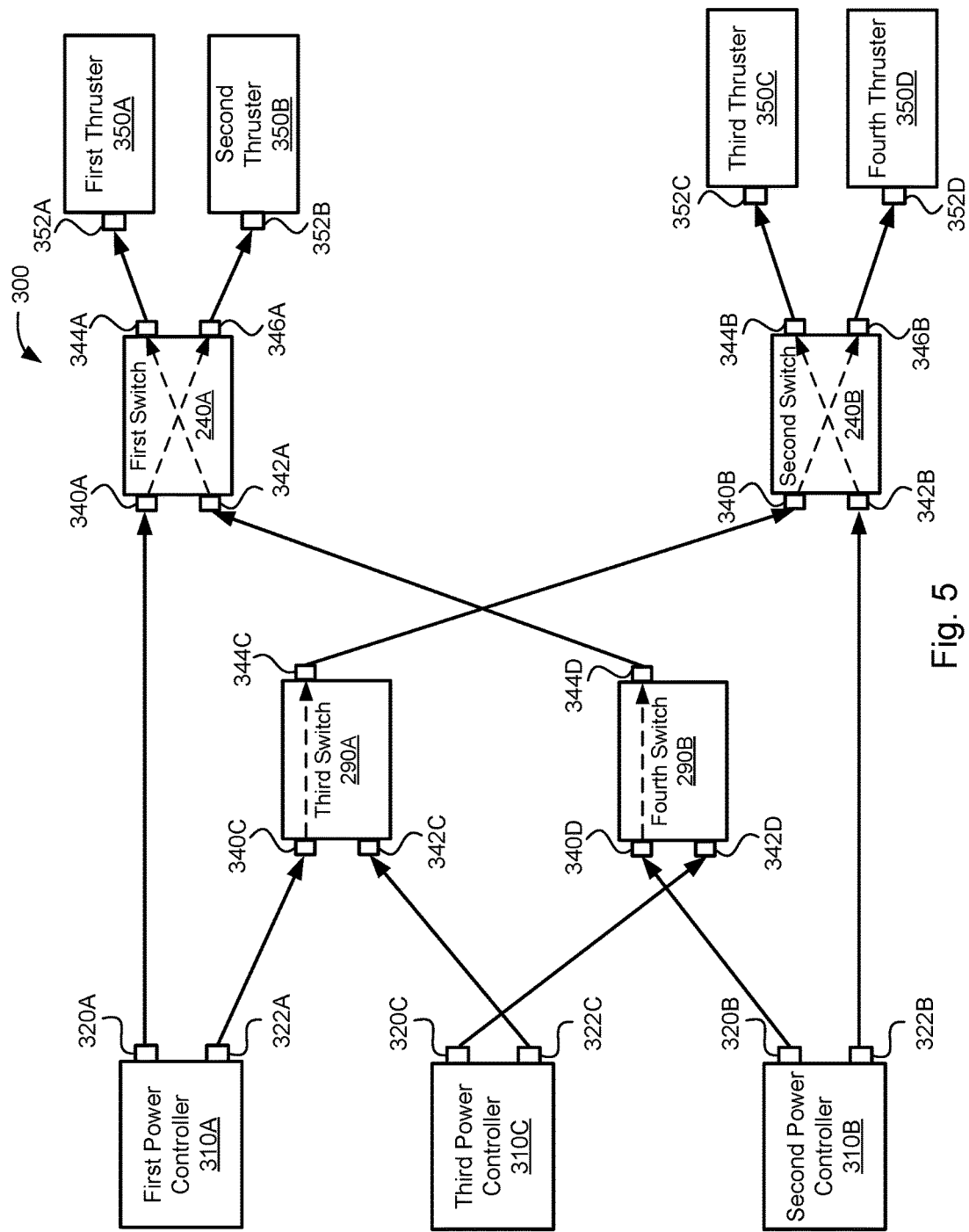
FIG. 5 is a schematic block diagram of the thrust system of FIG. 4 in a second configuration according to one embodiment.

As shown in FIG. 5, the thrust system 300 can be configured in a second operational mode. In the second operational mode, one or both of the first and second switches 240A-B are configured in a cross-strapped mode of operation. As indicated by dashed directional lines, in the cross-strapped mode of operation, the first input terminals 340A-B of the first and second switches 240A-B are electrically connected to the second output terminals 346A-B of the first and second switches, respectively, and the second input terminals 342A-B of the first and second switches are electrically connected to the first output terminals 344A-B of the first and second switches, respectively.

With the thrust system 300 configured in the second operational mode, electrical power from the first output terminal 320A of the first power controller 310A is routed to the second thruster 350B to power the second thruster, electrical power from the first output terminal 320B of the second power controller 310B is routed to the first thruster 350A, electrical power from the second output terminal 322A of the first power controller is routed to the fourth thruster 350D, and electrical power from the second output terminal 322B of the second power controller is routed to the third thruster 350C. Although both of the first and second switches 240A-B are shown in the cross-strapped mode of operation, in some implementations, only one of the first and second switches is in the cross-strapped mode of operation.

Figure 6:
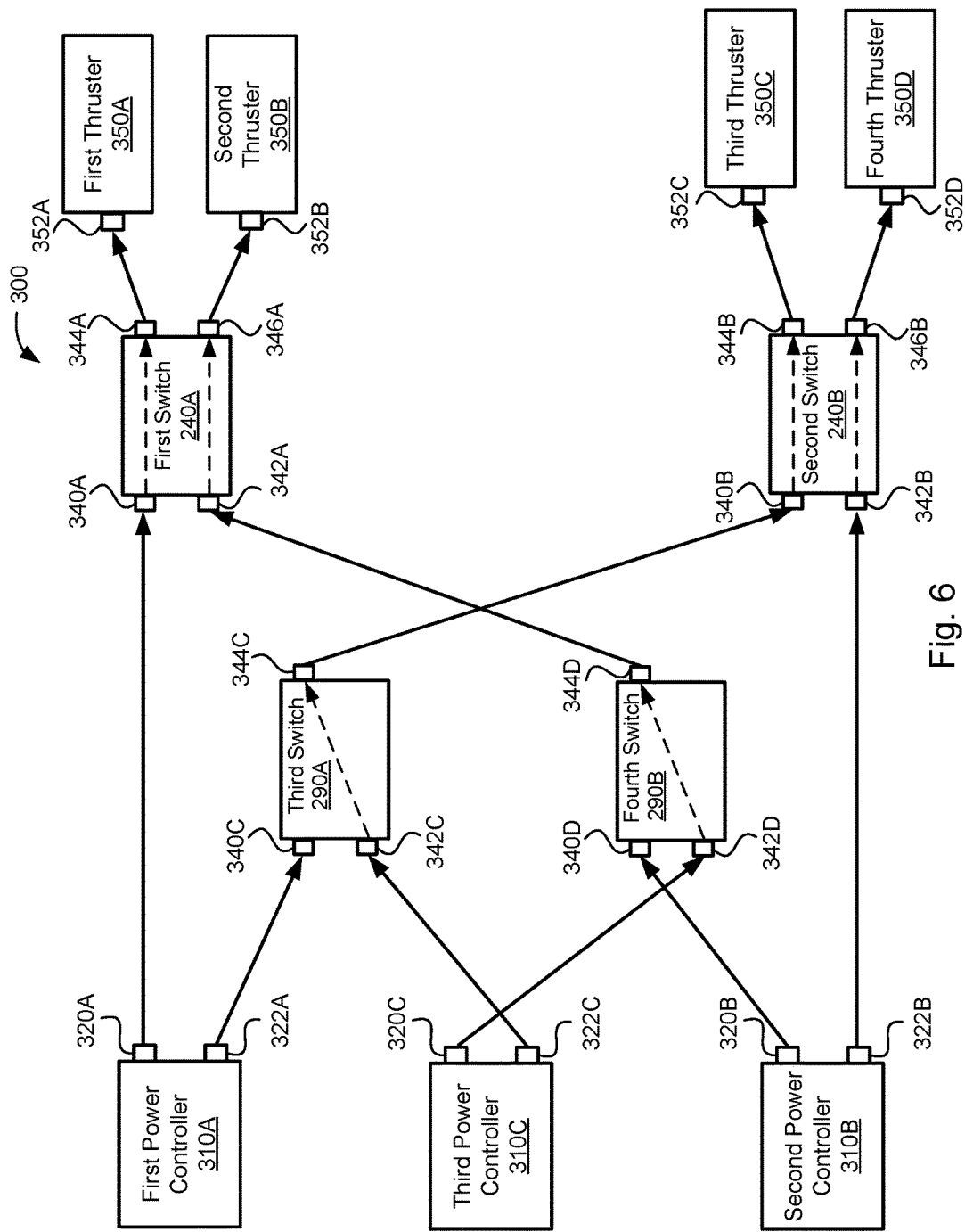
FIG. 6 is a schematic block diagram of the thrust system of FIG. 4 in a third configuration according to one embodiment.

In the first and second operational modes, the thrust system 300 is capable of powering no more than two of the four thrusters 350A-D at a time. Should it be desirable to power three thrusters 350A-D at a time, such as for the transfer of orbit of a satellite, or should one or both of the first and second power controllers 310A-B become inoperable, or should it be desirable to reduce usage of the first and/or second power controllers, the thrust system 300 can be configured into a third operational mode as shown in FIG. 6. In the third operational mode, one or both of the third and fourth switches 290A-B are configured in a cross-strapped mode of operation. As indicated by dashed directional lines, in the cross-strapped mode of operation, the second input terminals 342C-D of the third and fourth switches 290A-B are electrically connected to the first output terminals 344C-D of the third and fourth switches, respectively.

With the thrust system 300 configured in the third operational mode, electrical power from the first output terminal 320C of the third power controller 310C is routed to the fourth switch 290B, and from the fourth switch routed to either the first or second thruster 350A-B depending on the configuration of the first switch 240A. Similarly, in the third operational mode, electrical power from the second output terminal 322C of the third power controller 310C is routed to the third switch 290A, and from the third switch routed to either the third or fourth thruster 350C-D depending on the configuration of the second switch 240B. Although both of the third and fourth switches 290A-B are shown in the cross-strapped mode of operation, in some implementations, only one of the third and fourth switches is in the cross-strapped mode of operation.

Based on the foregoing, the thrust system 300 can be switched between first, second, and third operational modes depending on the condition and/or desired performance of the thrust system. For example, the thrust system 300 can be operated in either the first or second operational modes when providing thrust for station keeping operations of a satellite is needed. As described above, in the first or second operational modes, one or two of the thrusters can be powered at a time to provide the necessary thrust for station keeping operations. Then, when a transfer of orbit operation is necessary, the thrust system 300 can be switched to the third operational mode, which allows up to three of the thrusters to be powered concurrently. With more than two thrusters providing thrust concurrently, transfer of orbit operations can be performed quicker and more efficiently than with two or fewer thrusters. Additionally, should one or both of the first and second power controllers 310A-B become inoperable (e.g., malfunction or experience a performance drop), the thrust system 300 can be operated in the third operational mode to allow the third power controller 310C to effectively replace the inoperable power controller(s).

In some implementations, the thrusters of the thrust system 300 are grouped together to form separate groups associated with particular locations on a vehicle 10. For example, the first and second thrusters 350A-B can be grouped together at a specific location, such as a north side, of the vehicle 10. In contrast, the third and fourth thrusters 350C-D can be grouped together at another location, such as a south side, of the vehicle 10. For simplifying the control process, the thrust system 300 is configured such that, regardless of the mode of operation of the switches, electrical power from any of the first output terminals 320A-C of the power controllers 310A-C is always routed to one or both of the thrusters in a designated group of thrusters, such as, e.g., the first and second thrusters 350A-B on a north side of the vehicle 10, and electrical power from any of the second output terminals 322A-C of the power controllers is always routed to one or both of the thrusters in a different designated group of thrusters, such as, e.g., the third and fourth thrusters 350C-D on a south side of the vehicle 10.

Figure 7:
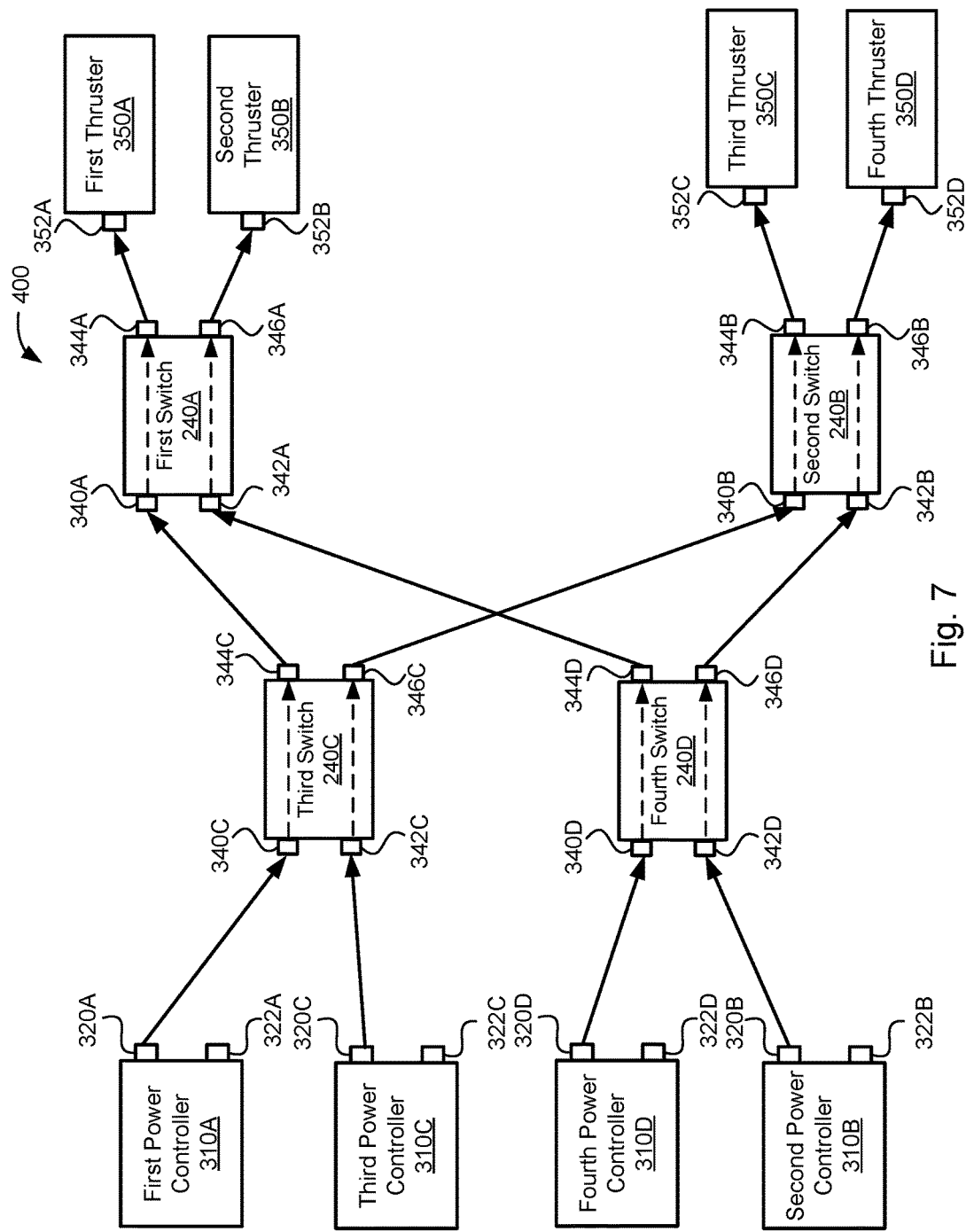
FIG. 7 is a schematic block diagram of a thrust system in a first configuration according to another embodiment.

Referring now to FIG. 7, according to one embodiment, a thrust system 400 similar to the thrust system 300 is shown. The thrust system 400 includes some features similar to the features of the thrust system 300. For example, the thrust system 400 includes first, second, and third power controllers 310A-C, first and second switches 240A-B, and first, second, third, and fourth thrusters 350A-D. However, unlike the thrust system 300, the thrust system 400 includes a fourth power controller 310D. Additionally, instead of third and fourth switches 290A-B, the thrust system 400 includes third and fourth switches 240C-D. The third and fourth switches 240C-D are the same as the first and second switches 240A-B in that the third and fourth switches have two output terminals 344A-B, 346A-B, respectively, instead of a single output terminal. In other words, the third and fourth switches 240C, 240D of the thrust system 300 are configured similarly to switch 240 of FIG. 2.

The first, second, third, and fourth power controllers 310A-D are respectively electrically connected to the third and fourth switches 240C-D by electrical lines as indicated by solid directional lines extending between these components. Similarly, the third and fourth switches 240C-D are respectively electrically connected to the first and second switches 240A-B by electrical lines as indicated by solid lines extending between these components. The first and second switches 240A-B are respectively electrically connected to the first, second, third, and fourth thrusters 350A-D by electrical lines as indicated by solid directional lines extending between these components. As with the thrust system 300, the electrical lines of the thrust system 400 are electrically coupled to each component via one or more input and/or output terminals.

Regarding the interconnection between the power controllers and the switches, although other configurations are possible in view of the present disclosure, in the illustrated configuration of the thrust system 400, the first output terminal 320A of the first power controller 310A is electrically connected directly to the first input terminal 340C of the third switch 240C, and the second output terminal 322A of the first power controller is capped or inactive (e.g., not electrically connected to any switch or thruster). Additionally, the first output terminal 320B of the second power controller 310B is electrically connected directly to the second input terminal 342D of the fourth switch 240D, and the second output terminal 322B of the second power controller is inactive. Furthermore, the first output terminal 320C of the third power controller 310C is electrically connected directly to the second input terminal 342C of the third switch 240C, and the second output terminal 322C of the third power controller is inactive. Similarly, the first output terminal 320D of the fourth power controller 310D is electrically connected directly to the first input terminal 340D of the fourth switch 240D, and the second output terminal 322D of the fourth power controller is inactive. Accordingly, in the illustrated embodiment, each of the second output terminals of the power controllers is inactive such that each power controller provides a single active output terminal for supplying electrical power. In an alternative embodiment, at least one or all of the power controllers may utilize the second output terminal as the single active output terminal and render inactive the first output terminal.

Regarding the interconnection between the switches and the thrusters, although other configurations are possible in view of the present disclosure, in the illustrated configuration of the thrust system 400, the first output terminal 344C of the third switch 240C is electrically connected directly to the first input terminal 340A of the first switch 240A, and the second output terminal 346C of the third switch 240C is electrically connected directly to the first input terminal 340B of the second switch 240B. In contrast, the first output terminal 344D of the fourth switch 240D is electrically connected directly to the second input terminal 342A of the first switch 240A, and the second output terminal 346D of the fourth switch 240D is electrically connected directly to the second input terminal 342B of the second switch 240B. Like the thrust system 300, the first output terminal 344A of the first switch 240A is electrically connected directly to the input terminal 352A of the first thruster 350A, and the second output terminal 346A of the first switch is electrically connected directly to the input terminal 352B of the second thruster 350B. Also, the first output terminal 344B of the second switch 240B is electrically connected directly to the input terminal 352C of the third thruster 350C, and the second output terminal 346B of the second switch is electrically connected directly to the input terminal 352D of the fourth thruster 350D.

The thrust system 400, as shown in FIG. 7, is configured in a first operational mode. In the first operational mode, each of the first, second, third, and fourth switches 240A-D are configured in a normal mode of operation. In the normal mode of operation, as indicated by dashed directional lines, the first input terminals 340A-D of the switches 240A-D are electrically connected to the first output terminals 344A-D of the switches, respectively, and the second input terminals 342A-D of the switches are electrically connected to the second output terminals 346A-D of the switches, respectively.

With the thrust system 400 configured in the first operational mode, as shown using directional lines, electrical power from the first output terminal 320A of the first power controller 310A is routed to the first thruster 350A to power the first thruster 350A, electrical power from the first output terminal 320B of the second power controller 310B is routed to the fourth thruster 350D, electrical power from the first output terminal 320C of the third power controller 310C is routed to the third thruster 350C, and electrical power from the first output terminal 320D of the fourth power controller is routed to the second thruster 350B.

Figure 8:
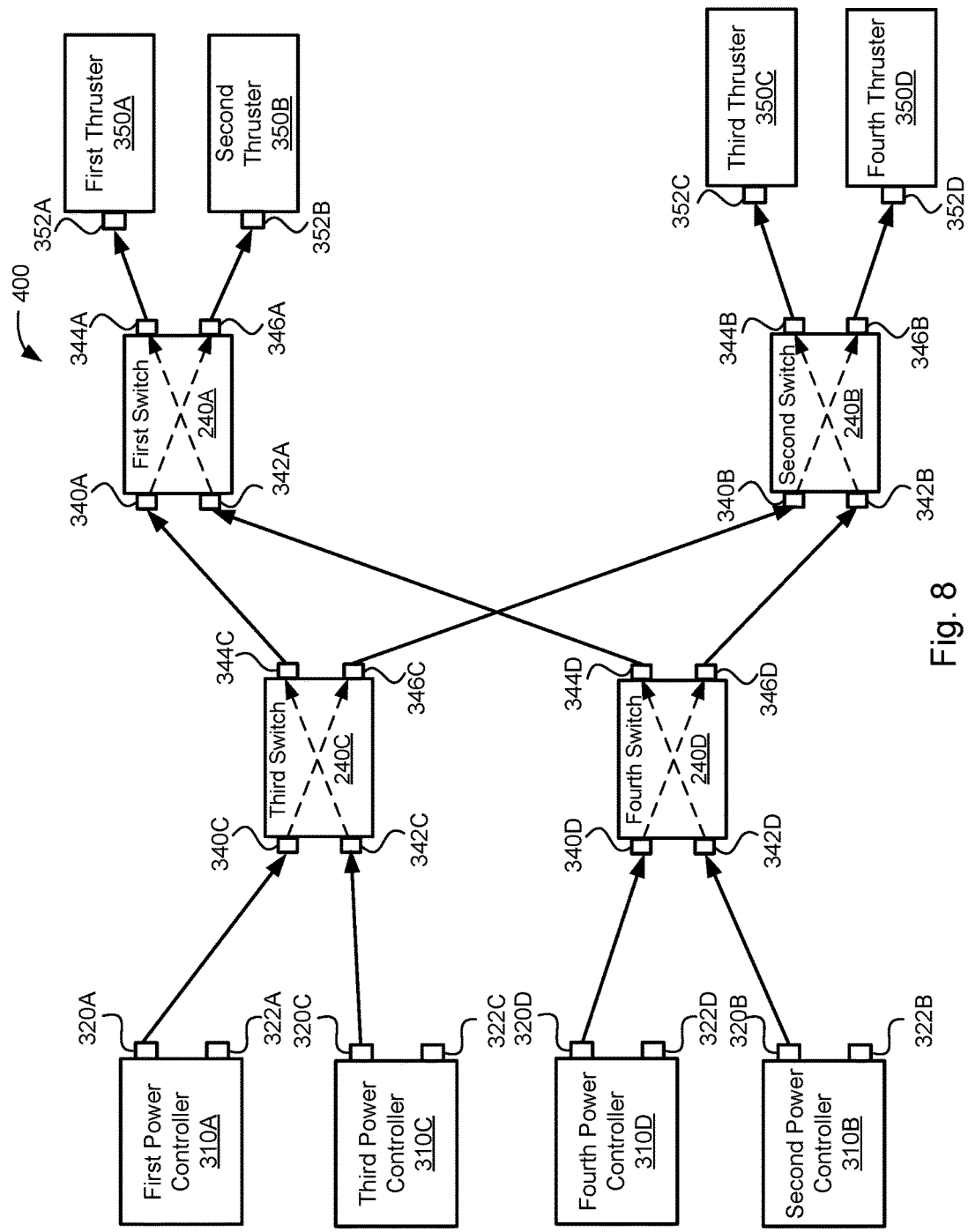
FIG. 8 is a schematic block diagram of the thrust system of FIG. 7 in a second configuration according to one embodiment.

As shown in FIG. 8, the thrust system 400 can be configured in a second operational mode. In the second operational mode, at least one of the first, second, third, and fourth switches 240A-D are configured in a cross-strapped mode of operation. As indicated by dashed directional lines, in the cross-strapped mode of operation, the first input terminals 340A-D of the switches 240A-D are electrically connected to the second output terminals 346A-D of the switches, respectively, and the second input terminals 342A-D of the switches are electrically connected to the first output terminals 344A-D of the switches, respectively.

With the thrust system 400 configured in the second operational mode and all the switches in the cross-strapped mode of operation, electrical power from the first output terminal 320A of the first power controller 310A is routed to the fourth thruster 350D to power the fourth thruster, electrical power from the first output terminal 320B of the second power controller 310B is routed to the first thruster 350A, electrical power from the first output terminal 320C of the third power controller 310C is routed to the second thruster 350B, and electrical power from the first output terminal 320D of the fourth power controller 310D is routed to the third thruster 350C.

Although all of the switches 240A-D are shown in the cross-strapped mode of operation in FIG. 8, in some implementations, in the second operational mode of the thrust system 400, less than all of the switches are in the cross-strapped mode of operation. Generally, any one or more of the switches 240A-D can be operated in the cross-strapped mode of operation such that any one of the power controllers 310A-D can supply power to any one of the thrusters 350A-D.

Based on the foregoing, the thrust system 400 can be switched between first and second operational modes depending on the condition and/or desired performance of the thrust system. For example, the thrust system 400 can be operated in either the first or second operational modes when providing thrust for station keeping operations of a satellite is needed. As described above, in the first or second operational modes, any of the thrusters can be powered one, two, or even three at a time by any one, two, or three of the power controllers to provide the necessary thrust for station keeping operations. Then, when a transfer of orbit operation is necessary, each of the four power controllers of the thrust system 400 is concurrently operated to supply power to a respective one of the four thrusters, which allows all four of the thrusters to be powered concurrently. With all four thrusters providing thrust concurrently, transfer of orbit operations can be performed quicker and more efficiently than with three or fewer thrusters. Additionally, should one, two, or three of the four power controllers of the system 400 become inoperable, any operable power controller(s) remaining can be used to supply power to any of the thrusters to effectively replace the inoperable power controller(s).

According to one embodiment, two of the four power controllers of the thrust system 400 can function as cold spares, while the other two power controllers function as the hot power controllers. In such an embodiment, the two hot power controllers supply the power for all the thrusters via frequent cycling of the switches. The cold spares remain inactive unless a failure of one or both of the hot power controllers requires one or both of the cold spares to be activated to replace a failed power controller, or unless a transfer of orbit operation demands one or more of the cold spares be activated for concurrently powering more than two thrusters. Alternatively, if less frequent cycling of the switches is desirable, in one embodiment, each of the four power controllers is a hot power controller that supplies power to a dedicated one of the four thrusters. Accordingly, according to some implementations, the present system allows for the use of cold spares and time sharing flexibility to improve reliability. Additionally, the system is configured to facilitate extended periods of non-use (e.g., up to 20 years) commonly associated with satellite applications. Also, the simplicity of the command structure for powering the thrusters reduces re-learning time following an extended period of non-use, which reduces errors from infrequent operation or untrained operators.

Figure 9:
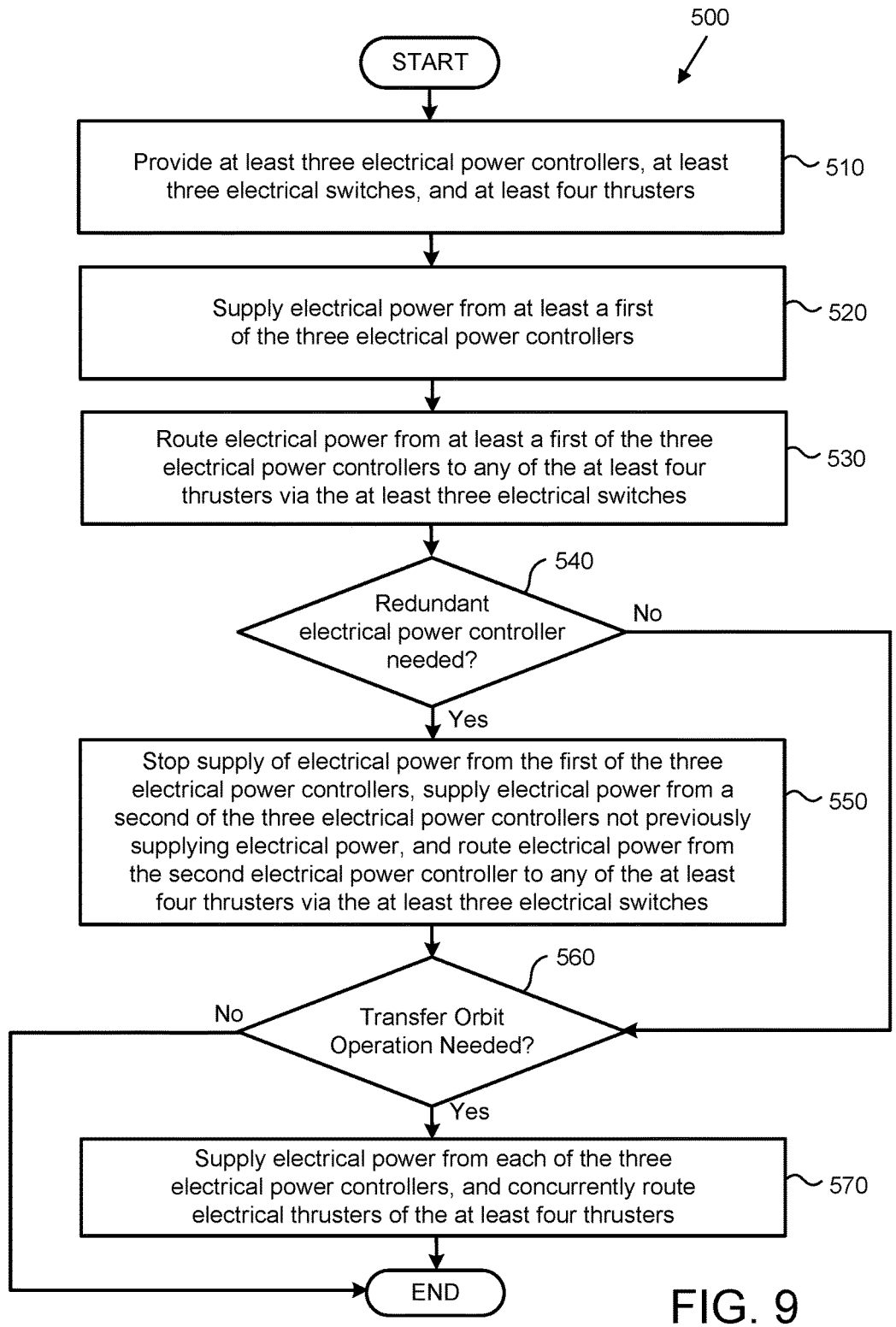
FIG. 9 is a schematic flow diagram of a method for providing thrust according to one embodiment.

Referring to FIG. 9, one embodiment of a method 500 for providing thrust for a vehicle includes providing at least three power controllers, at least three electrical switches, and at least four thrusters at 510. The method 500 further includes supplying electrical power from at least a first of the three electrical power controllers at 520. Supplying electrical power may include providing electrical power to a power output terminal of the first electrical power controller. The method 500 includes routing electrical power from the first electrical power controller to any of the four thrusters via the three electrical switches at 530. In response to receiving electrical power, the thrusters convert the electrical power into thrust for propelling the vehicle. At 540, the method 500 determines if a redundant electrical power controller is needed. As an example, a redundant electrical power controller may be needed if an electrical power controller supplying electrical power becomes inoperable. If a redundant electrical power controller is needed at 540, the method 500 proceeds to stop the supply of electrical power from the first electrical power controller (if the supply of electrical power has not already been stopped), supply electrical power from a second of the electrical power controllers that previously was not supplying electrical power, and route electrical power from the second electrical power controller to any of the four thrusters via the three electrical switches at 550. Step 550 may also, or alternatively, include rerouting a supply of electrical power from an operable electrical power controller to a thruster that was previously receiving electrical power from a now inoperable electrical power controller. If a redundant electrical power controller is not needed at 540, the method 500 proceeds to step 560.

At 560, the method 500 determines whether a transfer of orbit operation is needed. If a transfer of orbit operation is needed at 560, then the method 500 supplies electrical power from each of the three electrical power controllers, and concurrently routes the electrical power from the three electrical power controllers to respective thrusters of the four thrusters at 570 and ends. Concurrently supplying electrical power to three or more thrusters results in three or more thrusters concurrently providing thrust, which increases the overall thrust available for the transfer or orbit operation compared to two or fewer thrusters. If no transfer of orbit operation is needed at 560, then the method 500 ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the system controller 140 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The system controller 140 may be implemented as a hardware circuit comprising custom VLSI circuits or gate arrays, off-the-shelf semiconductors such as logic chips, transistors, or other discrete components. The system controller 140 may also be implemented in programmable hardware devices such as field programmable gate arrays, programmable array logic, programmable logic devices or the like.

The system controller 140 may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the system controller 140. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A thrust system for a vehicle, comprising:
at least four electrical power controllers;
at least four electrical switches each configured to receive electrical power from at least one of the at least four electrical power controllers; and
at least four thrusters each configured to receive electrical power from at least one of the at least four electrical switches;
wherein the at least four electrical switches are operable to switch a supply of electrical power from any of the at least four electrical power controllers to any one of the at least four thrusters.

2. The system of claim 1, wherein the at least four switches are operable to allow electrical power from the at least four electrical power controllers to be concurrently supplied to the at least four thrusters, with each electrical power controller supplying power to a respective one of the at least four thrusters.

3. The system of claim 1, wherein one of the at least four electrical power controllers is a redundant power controller, and wherein in a first mode a first of the at least four electrical power controllers supplies electrical power to a first of the at least four thrusters, a second of the at least four electrical power controllers supplies electrical power to a second of the at least four thrusters, and the redundant power controller supplies no electrical power to the first and second thrusters, and wherein in a second mode one of the first and second electrical power controllers supplies no electrical power to the first and second thrusters, respectively, and the redundant power control supplies electrical power to one of the first and second electrical power controllers.

4. The system of claim 1, wherein the at least four electrical switches are operable to allow electrical power from the at least four electrical power controllers to be concurrently supplied to the at least four thrusters, with each electrical power controller supplying power to a respective one of the at least four thrusters.

5. The system of claim 1, wherein:
each electrical power controller comprises a first power output;
each electrical switch comprises a first power input, a second power input, a first power output, and a second power output;
the first power output of a first of the electrical power controllers is electrically coupled to the first power input of a first of the electrical switches;
the first power output of a second of the electrical power controllers is electrically coupled to the second power input of the first of the electrical switches;
the first power output of a third of the electrical power controllers is electrically coupled to the first power input of a second of the electrical switches; and
the first power output of a fourth of the electrical power controllers is electrically coupled to the second power input of the second of the electrical switches.

6. The system of claim 5, wherein:
the first power output of the first of the electrical switches is electrically coupled to the first power input of a third of the electrical switches;
the second power output of the first of the electrical switches is electrically coupled to the first power input of a fourth of the electrical switches;
the first power output of the second of the electrical switches is electrically coupled to the second power input of the third of the electrical switches;
the second power output of the second of the electrical switches is electrically coupled to the second power input of the fourth of the electrical switches;
the first power output of the third of the electrical switches is electrically coupled to a first of the thrusters, and the second power output of the third of the electrical switches is electrically coupled to a second of the thrusters; and
the first power output of the fourth of the electrical switches is electrically coupled to a third of the thrusters, and the second power output of the fourth of the electrical switches is electrically coupled to a fourth of the thrusters.

7. The system of claim 6, wherein:
the first of the electrical switches is actuatable to either (i) route electrical power from the first power input of the first of the electrical switches to the first power output of the first of the electrical switches and route electrical power from the second power input of the first of the electrical switches to the second power output of the first of the electrical switches, or (ii) route electrical power from the first power input of the first of the electrical switches to the second power output of the first of the electrical switches and route electrical power from the second power input of the first of the electrical switches to the first power output of the first of the electrical switches;
the second of the electrical switches is actuatable to either (i) route electrical power from the first power input of the second of the electrical switches to the first power output of the second of the electrical switches and route electrical power from the second power input of the second of the electrical switches to the second power output of the second of the electrical switches, or (ii) route electrical power from the first power input of the second of the electrical switches to the second power output of the second of the electrical switches and route electrical power from the second power input of the second of the electrical switches to the first power output of the second of the electrical switches;
the third of the electrical switches is actuatable to either (i) route electrical power from the first power input of the third of the electrical switches to the first power output of the third of the electrical switches and route electrical power from the second power input of the third of the electrical switches to the second power output of the third of the electrical switches, or (ii) route electrical power from the first power input of the third of the electrical switches to the second power output of the third of the electrical switches and route electrical power from the second power input of the third of the electrical switches to the first power output of the third of the electrical switches; and
the fourth of the electrical switches is actuatable to either (i) route electrical power from the first power input of the fourth of the electrical switches to the first power output of the fourth of the electrical switches and route electrical power from the second power input of the fourth of the electrical switches to the second power output of the fourth of the electrical switches, or (ii) route electrical power from the first power input of the fourth of the electrical switches to the second power output of the fourth of the electrical switches and route electrical power from the second power input of the fourth of the electrical switches to the first power output of the fourth of the electrical switches.

8. The system of claim 1, wherein each of the at least four thrusters is an ion propulsion thruster.

9. The system of claim 1, wherein each of the at least four thrusters is enabled for maximum thrust output.

10. The system of claim 1, wherein the at least four electrical switches are configured such that each of the at least four electrical power controllers supplies electrical power to only one of the at least four thrusters at a time.

11. A thrust system for a vehicle, comprising:
at least four electrical power controllers;
at least four electrical switches in power receiving communication with at least one of the electrical power controllers;
at least four thrusters each in power receiving communication with one of the electrical switches; and
a system controller operably coupled to the electrical switches and thrusters to control electrical power supply from the electrical power controllers to the thrusters, wherein in a first mode the system controller operates the electrical switches and thrusters to nonconcurrently supply power to each of the four thrusters from less than four electrical power controllers, and in a second mode the system controller operates the electrical switches and thrusters to concurrently supply power to each of the four thrusters from a respective one of the four electrical power controllers.

12. The thrust system of claim 11, wherein in a third mode the system controller operates the at least four electrical switches and the at least four thrusters to nonconcurrently supply power to each of the at least four thrusters from a dedicated one of each of the at least four electrical power controllers.

13. A method for providing thrust for a vehicle, comprising:
supplying electrical power from any of at least four electrical power controllers; and
routing electrical power from any of the at least four electrical power controllers to any of at least four thrusters via at least four electrical switches.

14. The method of claim 13, wherein at least a second of the at least four electrical power controllers does not supply electrical power, the method further comprising:
stopping the supply of electrical power from at least a first of the at least four electrical power controllers;
supplying electrical power from the at least second of the at least four electrical power controllers; and
routing electrical power from the at least second of the at least four electrical power controllers to any of the at least four thrusters via the at least four electrical switches.

15. The method of claim 13, further comprising:
supplying electrical power from each of the at least four electrical power controllers; and
concurrently routing electrical power from the at least four electrical power controllers to a respective one of each of four of the at least four thrusters.

16. The method of claim 15, wherein the vehicle is a satellite, and wherein electrical power from each of the at least four electrical power controllers is supplied and electrical power from the at least four electrical power controllers is concurrently routed to a respective one of each of four of the at least four thrusters during a transfer orbit operation of the satellite.

17. The thrust system of claim 1, wherein:
each of the at least four electrical switches is configured to receive electrical power from two of the at least four electrical power controllers; and
at least one of the at least four electrical switches comprises an output electrically connected with an input of another of the at least four electrical switches to provide electrical power to the other of the at least four electrical switches.

18. The thrust system of claim 1, wherein:
each of the at least four electrical switches is configured to receive electrical power from two of the at least four electrical power controllers; and
at least a third electrical switch of the at least four electrical switches comprises:
a first output electrically connected with an input of a first electrical switch of the at least four electrical switches to provide electrical power to the first electrical switch of the at least four electrical switches; and
a second output electrically connected with an input of a second electrical switch of the at least four electrical switches to provide electrical power to the second electrical switch of the at least four electrical switches.

19. The thrust system of claim 11, wherein in a third mode the system controller operates the at least four electrical switches and the at least four thrusters to nonconcurrently supply power to each of the at least four thrusters from less than four of the at least four electrical power controllers, wherein one of the at least four electrical power controllers supplying power to the at least four thrusters in the third mode does not supply power to the thrusters in the first mode.

20. The thrust system of claim 11, wherein the vehicle comprises a satellite, the thrust system further comprising the satellite.

* * * * *